Sept. 17, 1957   F. C. HUND   2,806,733
WEEDING TOOL
Filed March 23, 1955
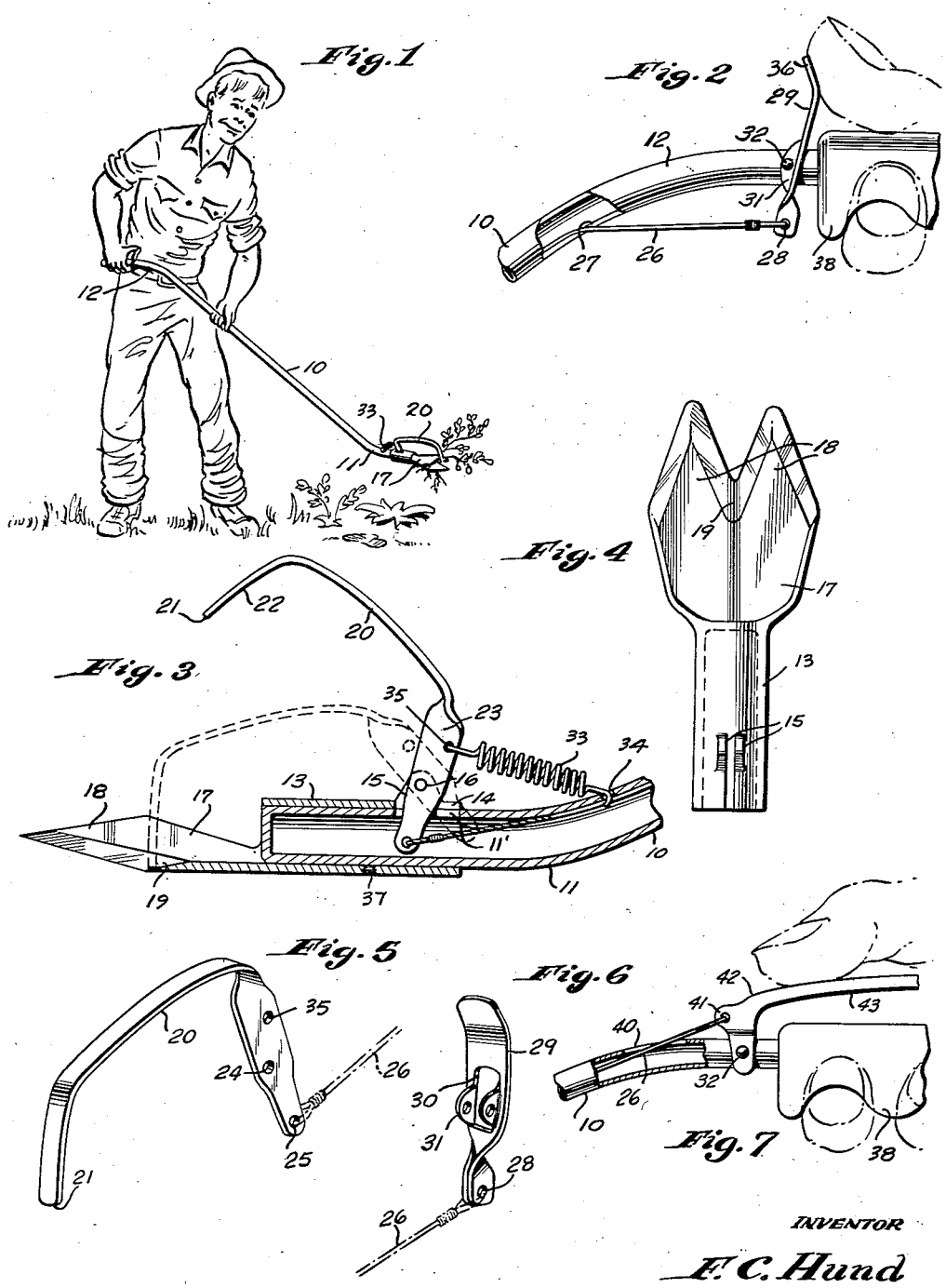
INVENTOR
F. C. Hund
BY H. Yates Dowell
Attorney

United States Patent Office 2,806,733
Patented Sept. 17, 1957

2,806,733

WEEDING TOOL

Frank C. Hund, Nashville, Tenn., assignor of thirty-five percent to Warren H. Stevenson and fifteen percent to Jack E. Montgomery, Nashville, Tenn.

Application March 23, 1955, Serial No. 496,114

1 Claim. (Cl. 294—50.9)

This invention relates to the care and cultivation of plant life including gardens or lawns and other premises, and more particularly, to equipment employed in such care and cultivation, including that for removing weeds and excess growth and for picking up and disposing of the same.

Removing weeds and excess plants frequently is a laborious and time consuming undertaking, exacting a heavy toll on the muscles of the body of the operator, and numerous implements and ways of accomplishing the desired result have been devised and proposed. These have ben unsatisfactory for numerous reasons including not only the implements themselves but the fact that they require undue exertion, stooping and bending on the part of the operator.

It is an object of the invention to overcome the disadvantages above enumerated and to provide a simple, inexpensive, handy-to-use gardening tool which is relatively light in weight and so constructed and arranged that undesirable weeds and other rooted vegetation may be easily and effectively removed and after severance from its root the weed or other plant may be readily gripped, picked up and deposited in a container or receptacle for disposition of the same and all of the manipulation of the tool may be accomplished while the operator is in an erect or standing position.

Another object of the invention is to provide an improved gardening tool of compact construction which is relatively strong and rugged which will last indefinitely and which not only can be operated with minimum effort, but which is positive and effective in use.

Other objects and advantages of the invention will be apparent from the following description taken in conjunction with the accompanying drawing wherein:

Fig. 1 is a perspective illustrating the use of one application of the invention;

Fig. 2, an enlarged fragmentary detail showing the manipulating end of the tool;

Fig. 3, an enlarged longitudinal section of the cutting end of the tool;

Fig. 4, a top plan view of the cutting head;

Fig. 5, a perspective of the gripping lever;

Fig. 6, a perspective of the operating lever; and

Fig. 7, an enlarged fragmentary detail of the control end of the device.

Briefly stated the invention comprises an elongated tubular handle having a forked cutting head at one end, and a hand grip at the other. Adjacent the hand grip is mounted a pivoted lever by which endwise movement of a wire cable in the center of the handle may be accomplished. The opposite end of such cable is connected to one end of a gripping lever pivoted on the cutting head, a coil spring being connected to such lever to maintain it retracted. The entire device, for use with small weeds or plants, can be made weighing fourteen ounces or less, the size depending upon the use to which the device is to be put. The device may be held in the hand and a forward motion imparted to the forked cutting head to sever a weed or plant after which the actuating member may be operated which will cause the gripping finger or lever to engage and hold the weed so that it can be picked up and deposited in a suitable container or receptacle, all while the operator is standing and without bending the back.

With continued reference to the drawing, an elongated tubular handle 10 is provided of approximately four feet in length and with slightly and oppositely curved end portions 11 and 12 so that when the curved end portion 12 is held during use the extremities of the handle will be in substantially horizontal position with an inclined main body portion therebetween.

On the end of the handle, adjacent the curved portion 11 which forms the lower end of the device, is mounted a cutting head comprising a sleeve 13 having a split 14 with a pair of clamping ears 15 adapted to be contracted by means of a bolt 16, such bolt likewise serving as a pivot as hereinafter described. The sleeve 13 is provided with a trough-shaped plate portion 17 terminating substantially in the shape of an inverted W providing a pair of tapered knives 18 with a slot or bifurcation 19 between the same and into which a weed or plant to be cut is received and severed from its root.

The sleeve 13 is of an internal diameter sufficient to snugly receive the handle 10, and by tightening the bolt 16 which extends through the clamping ears 15 the sleeve may be tightened onto the handle. At the base of the slot or bifurcation 19 the metal is curved and in order to grip a weed a gripping or holding finger or lever 20 is provided having a curved extremity 21 for snugly engaging such curved surfaces. The gripping finger has end portions 22 and 23 respectively bent at slightly less than right angles to its body and with the end portion 23 at the rear end of the gripping finger twisted 90° so that the plane of such end portion is substantially at right angles to the plane of the remaining portion of the finger.

The end portion 23 is slightly longer than end portion 22 and is provided intermediate its ends with a central opening 24 in which the pivot bolt 16 is located and with the outer extremity of such end having an additional opening 25 to which is connected an operating wire cable 26 which extends through the handle and through an opening 27 near the opposite end of the handle and is connected to the eye 28 of an operating or actuating member 29 having an opening 30 with lateral ears 31 disposed at each side of the handle and on which the operating or actuating member is mounted by means of a cotter pin 32.

Rocking of the lever on its cotter pin pivot 32 will cause retraction of the operating cable 26 and the swinging of the lower portion of the pivoted gripping or holding finger to which it is connected thereby causing the free opposite end of the holding finger to swing downwardly and to contact a weed within the fork of the cutting head.

In order to maintain the gripping or holding finger in operative position a coil spring 33 may be provided, one end of which can be hooked in an opening 34 in the curved portion 11 of the handle 10 and the other end of which can be hooked in an eye 35 of the flat portion 23 of the gripping finger.

The operating member 29 may be provided with a thumb portion 36. Also, the cutting head may be provided with a set screw 37 for additionally uniting the parts and it will of course be understood that the handle will be provided with a slot 11' through which the long end 23 projects. It will also be understood that a hand grip 38 of any desired material, such as aluminum, wood, or the like, may be provided on the end of the handle adjacent the operating member 29.

It will be understood that a simple tool is provided which is light in weight and consequently can be held in one hand and pushed to cut a weed or a plant and then by slight pressure of the thumb on the operating member 29 the gripping or holding finger can be caused to engage and hold the severed portion of the weed or plant so that by movement of the device such severed portion can be deposited in a container or receptacle.

The actuating lever 29 which operates the gripping finger is engageable at one end and the operating cable is connected to the other end so that in operating the lever it is pushed from its upper end.

In Fig. 7 is disclosed a slightly different type of operating lever, the handle 10 being provided with an opening 40 through which the cable 26 extends, such cable being anchored in an opening 41 on the lever 42 and having an operating portion 43 adapted to be gripped for rotating the lever on its pivotal mounting 32. By exerting pressure in the hand the cable 26 can be retracted to cause the finger or gripping member 20 to engage the blade.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

A weeding tool for use by an operator standing erect with the weed engaging portion of the tool in front of the operator in a position to be easily observed during use, said tool comprising an elongated hollow handle having an end offset angularly to provide a hand grip portion and with its opposite end similarly but reversely offset to receive a cutter head thereon, a cutter head having substantially flat sides angularly joined and forming a trough shaped body with a forked cutting edge at one end and a split sleeve at its opposite end, said split sleeve having spaced ears, a pivot bolt for contracting said ears, a gripping element pivoted on said bolt between said ears and adapted to engage said cutter head, actuating means having a portion disposed lengthwise within said handle and connected to said gripping element for swinging the latter, a lever mounted adjacent the opposite end of said handle and having a connection with said actuating means whereby movement of the lever will operate said gripping member.

References Cited in the file of this patent

UNITED STATES PATENTS

| | | |
|---|---|---|
| 842,420 | Petty | Jan. 29, 1907 |
| 1,131,714 | Kress | Mar. 16, 1915 |
| 1,751,481 | La Tourrette | Mar. 25, 1930 |
| 1,920,169 | Briggs | Aug. 1, 1933 |
| 2,033,431 | Krauter | Mar. 10, 1936 |
| 2,373,872 | Couture | Apr. 17, 1945 |